(12) United States Patent  
Lee

(10) Patent No.: US 9,311,519 B2  
(45) Date of Patent: Apr. 12, 2016

(54) FINGERPRINT RECOGNITION METHOD AND ELECTRONIC DEVICE THEREOF

(71) Applicant: Samsung Electronics Co., Ltd., Gyeonggi-do (KR)

(72) Inventor: Heon-Tak Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 136 days.

(21) Appl. No.: 14/105,303

(22) Filed: Dec. 13, 2013

(65) Prior Publication Data

US 2014/0294259 A1    Oct. 2, 2014

(30) Foreign Application Priority Data

Mar. 26, 2013  (KR) .......................... 10-2013-0032119

(51) Int. Cl.
*G06K 9/00* (2006.01)
*G06K 9/03* (2006.01)

(52) U.S. Cl.
CPC ............ *G06K 9/00013* (2013.01); *G06K 9/033* (2013.01)

(58) Field of Classification Search
USPC ........ 382/115, 116, 124, 278; 340/5.52, 5.81, 340/8.82, 5.83
See application file for complete search history.

(56) References Cited

U.S. PATENT DOCUMENTS

| | | | | |
|---|---|---|---|---|
| 7,088,220 B2* | 8/2006 | Kotzin | ......................... | 340/5.82 |
| 7,412,081 B2* | 8/2008 | Doi | ............................... | 382/118 |
| 7,539,331 B2* | 5/2009 | Wendt et al. | .................. | 382/124 |
| 8,239,340 B2* | 8/2012 | Hanson | ................... | H04L 69/22 |
| | | | | 706/47 |
| 8,468,581 B2* | 6/2013 | Cuende Alonso | ................ | 726/4 |
| 8,485,442 B2* | 7/2013 | McNeal | ........................ | 235/382 |
| 8,554,291 B2* | 10/2013 | Takagi | ................ | H04M 1/0237 |
| | | | | 455/575.4 |
| 8,610,574 B2* | 12/2013 | Kestenbaum | .......... | G06K 17/00 |
| | | | | 221/124 |
| 8,666,924 B2* | 3/2014 | Hanson | .................... | H04L 69/22 |
| | | | | 706/47 |

FOREIGN PATENT DOCUMENTS

| KR | 10-2007-0083743 A | 8/2007 |
|---|---|---|
| KR | 10-01191617 B1 | 10/2012 |
| KR | 10-2012-0121228 A | 11/2012 |

* cited by examiner

*Primary Examiner* — Yosef Kassa  
(74) *Attorney, Agent, or Firm* — Cha & Reiter, LLC.

(57) ABSTRACT

A method and apparatus for recognizing a fingerprint in an electronic device includes recognizing a fingerprint that is input through a touch-based device, determining whether the recognized fingerprint is a white image, and when the recognized image is determined to be a white image, displaying on a display screen a request for a fingerprint retouch.

18 Claims, 12 Drawing Sheets

NORMAL FINGERPRINT RECOGNITION

FINGERPRINT RECOGNITION ERRORS (WHITE IMAGE)

FINGERPRINT RECOGNITION METHOD AND ELECTRONIC DEVICE THEREOF

CLAIM OF PRIORITY

This application claims priority under 35 U.S.C. §119 to an application filed in the Korean Intellectual Property Office on Mar. 26, 2013 and assigned Serial No. 10-2013-0032119, the contents of which are incorporated herein by reference.

BACKGROUND

1. Technical Field

The present disclosure relates generally to a fingerprint recognition method and an electronic device thereof.

2. Description of the Related Art

Electronic devices such as portable phones, portable multimedia players (PMP), and personal digital assistants (PDA) are widely used necessities of modern society. More and more electronic devices incorporate fingerprint recognition functionality. Fingerprint recognition operates by obtaining a fingerprint image and comparing the obtained fingerprint image to a stored fingerprint image, thereby authenticating a particular user by leveraging the fact that fingerprints are unique to each individual. Fingerprint recognition function is used widely in security system and other authentication fields, and can be implemented in a variety of ways, such as by optical, capacitive, thermal sensing, and radio frequency ("RF") methodologies.

The standard fingerprint recognition process is implemented by obtaining a gray-scale image of a fingerprint pattern (as illustrated in FIG. 1A). However, when a finger or a touch display surface is contaminated with foreign substances (such as water or some other conductive material), the resulting image may be overly white (as illustrated in FIG. 1B). Therefore, although the user has properly conducted the fingerprint touch operation, a fingerprint recognition error may nonetheless occur.

This may be an issue where users have a limited number of attempts to authenticate. Because of the fingerprint recognition error, the number of remaining allowable attempts will be decreased by 1. If the fingerprint recognition is configured such that some number of failures imposes a temporary system lock, this, may cause serious inconvenience to a user.

Accordingly, there is a need for a fingerprint recognition method and apparatus that enhances user convenience by reducing fingerprint recognition errors without compromising the security of electronic device fingerprint-based authentication.

SUMMARY

The present invention provides a fingerprint recognition method and an electronic device thereof that enhances the ability to accurately conduct fingerprint recognition and authentication processes in the presence of less than ideal circumstances without compromising authentication security.

Another aspect of the present invention is to provide a fingerprint recognition method and apparatus for outputting a request for a fingerprint "retouch" (that is, a request that the user reapply his finger to the fingerprint reader) when fingerprint recognition errors occur.

Another aspect of the present invention is to provide a fingerprint recognition method and apparatus which enhances user convenience by reducing the number of fingerprint recognition errors and improving the reliability of the electronic device.

According to another aspect of the present invention, a method for recognizing a fingerprint in an electronic device includes: recognizing a fingerprint that is input through a touch input, determining whether the recognized fingerprint is a "white image," and when the recognized image is determined to be the white image, outputting a request for fingerprint retouch.

According to another aspect of the present invention, an electronic device includes a touch display, a fingerprint recognition device for recognizing a fingerprint that is input through a touch input on the touch display, at least one memory, a processor for determining whether the recognized fingerprint is a white image, and, when the recognized image is determined to be the white image, outputting a request for fingerprint retouch.

According to another aspect of the present invention, a method for recognizing a fingerprint in an electronic device includes: recognizing the fingerprint that is input through a touch input, determining whether an area of the recognized fingerprint is smaller than a reference value, and when the area is smaller than the reference value, outputting a request for a fingerprint retouch input.

According to another aspect of the present invention, an electronic device includes a touch display, a fingerprint recognition device for recognizing a fingerprint that is input through touch on the touch display, at least one memory, and a processor, wherein the processor determines whether an area of the recognized fingerprint is smaller than a reference value, and, when the area is smaller than the reference value, outputting a request for a fingerprint retouch input.

According to another aspect of the present invention, a method for recognizing a fingerprint in an electronic device includes recognizing the fingerprint that is input through a touch input, and determining whether the recognized fingerprint matches a pre-stored fingerprint. When the recognized fingerprint does not match the pre-stored fingerprint, it is determined whether the recognized fingerprint is a white image. When the recognized image is determined to be the white image, a request is output for a fingerprint retouch input, and when the recognized image is determined not to be the white image, it is determined that fingerprint authentication has failed one authentication attempt.

BRIEF DESCRIPTION OF THE DRAWINGS

The above features and advantages of the present invention will become more apparent from the following detailed description when taken in conjunction with the accompanying drawings, in which.

DETAILED DESCRIPTION

As various modifications may be made and diverse embodiments are applicable to the present invention, specific embodiments will be illustrated with reference to the accompanying drawings and described more fully in the detailed description. However, those specific embodiments should not be construed as limiting the present invention, and should be interpreted as including all modifications, equivalents, and substitutes falling within the spirit and scope of the invention.

It will be understood that, although the terms first, second, third, etc., may be used herein to describe various elements or components, these elements or components should not be limited by these terms. These terms are only used to distinguish one element or component from another element or component. Thus, a "first" element or component may be termed a "second" element or component without departing from the spirit and scope of the present invention.

It will be understood that when an element or component is referred to as being "connected to" or "coupled to" another element or component, it may be directly connected or coupled to the other element, or intervening elements or components may be present. In contrast, when an element or component is referred to as being "directly connected to" or "directly coupled to" another element or component, there are no intervening elements or components present.

The terminology used herein is provided for the purpose of describing specific embodiments only, and is not intended to limit the present invention. As used herein, the singular forms "a," "an" and "the" are intended to include the plural forms as well, unless the context clearly indicates otherwise. It will also be understood that the terms "comprises," "includes," and "has," when used in this specification, specify the presence of stated features, integers, steps, operations, elements, and/or components, but do not preclude the presence or addition of one or more other features, integers, steps, operations, elements, components, or combinations thereof.

Hereinafter, exemplary embodiments of the present invention will be described in detail with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the following description, detailed descriptions of well-known functions or configurations will be omitted since they would unnecessarily obscure the subject matter of the present invention.

The present invention relates to a fingerprint recognition method and apparatus for reducing the occurrence of fingerprint recognition errors during a fingerprint authentication process.

Figure 2A:
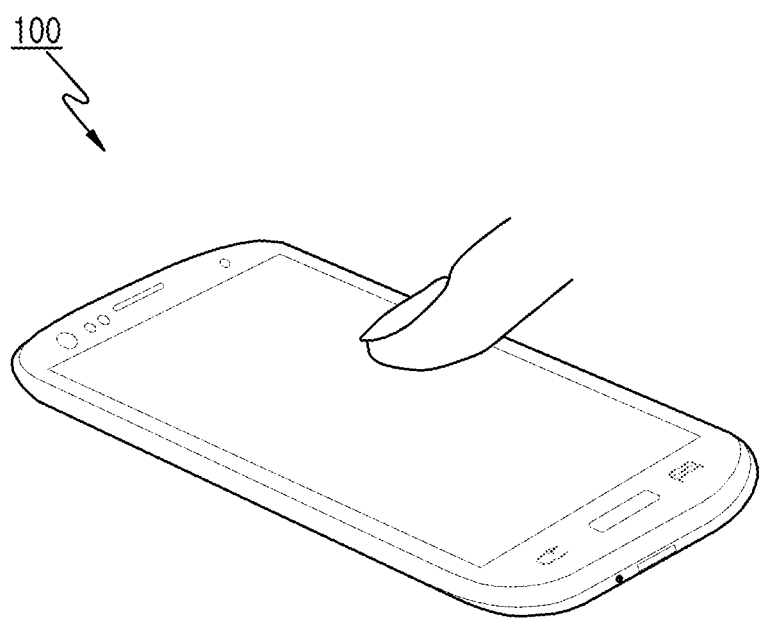
FIG. 2A is an illustration visualizing one example delivery of a fingerprint to an electronic device through a direct touch to a touchscreen, according to an embodiment of the present invention.

FIG. 2A is an illustration visualizing one example delivery of a fingerprint to an electronic device through a direct touch to a touchscreen, according to an embodiment of the present invention. Examples of the electronic device 100 may include a mobile phone, a mobile pad, a media player, a tablet computer, a handheld computer, a Personal Digital Assistant (PDA), etc. The electronic device may be any such arbitrary electronic device 100 including a device encompassing two or more functions native to the above-described devices.

In particular, the electronic device 100 may be used to recognize a fingerprint. A fingerprint refers to the flowing pattern of ridges in the tip of an individual's finger. The fingerprint may be "recognized" (i.e., identified as a fingerprint by the electronic device 100 through analysis, definition or recognition of a representative digital image) through input into the electronic device 100 via a direct touch input method, or a touchless input method.

The fingerprint may be used to authenticate a user. That is, the fingerprint may be recognized (e.g., visualized digitally as a fingerprint image), and then compared against a stored fingerprint image. A match between the fingerprint image and the stored fingerprint image may identify a particular user to the electronic device 100, leveraging the fact that fingerprints are unique to each individual.

In addition, the fingerprint authentication electronic device 100 may be used advantageously in various security system and authentication fields. For example, fingerprint recognition authentication may be used to control lock release and password release in the electronic device 100. Other tasks requiring user authentication, such as account log-in, file access, etc., may also benefit from the fingerprint authentication electronic device 100.

A fingerprint recognition method and apparatus may include at least one of optical, capacitive, thermal sensing and RF methods according to various embodiments. A detailed description for the fingerprint recognition method and apparatus is provided below.

Figure 2B:
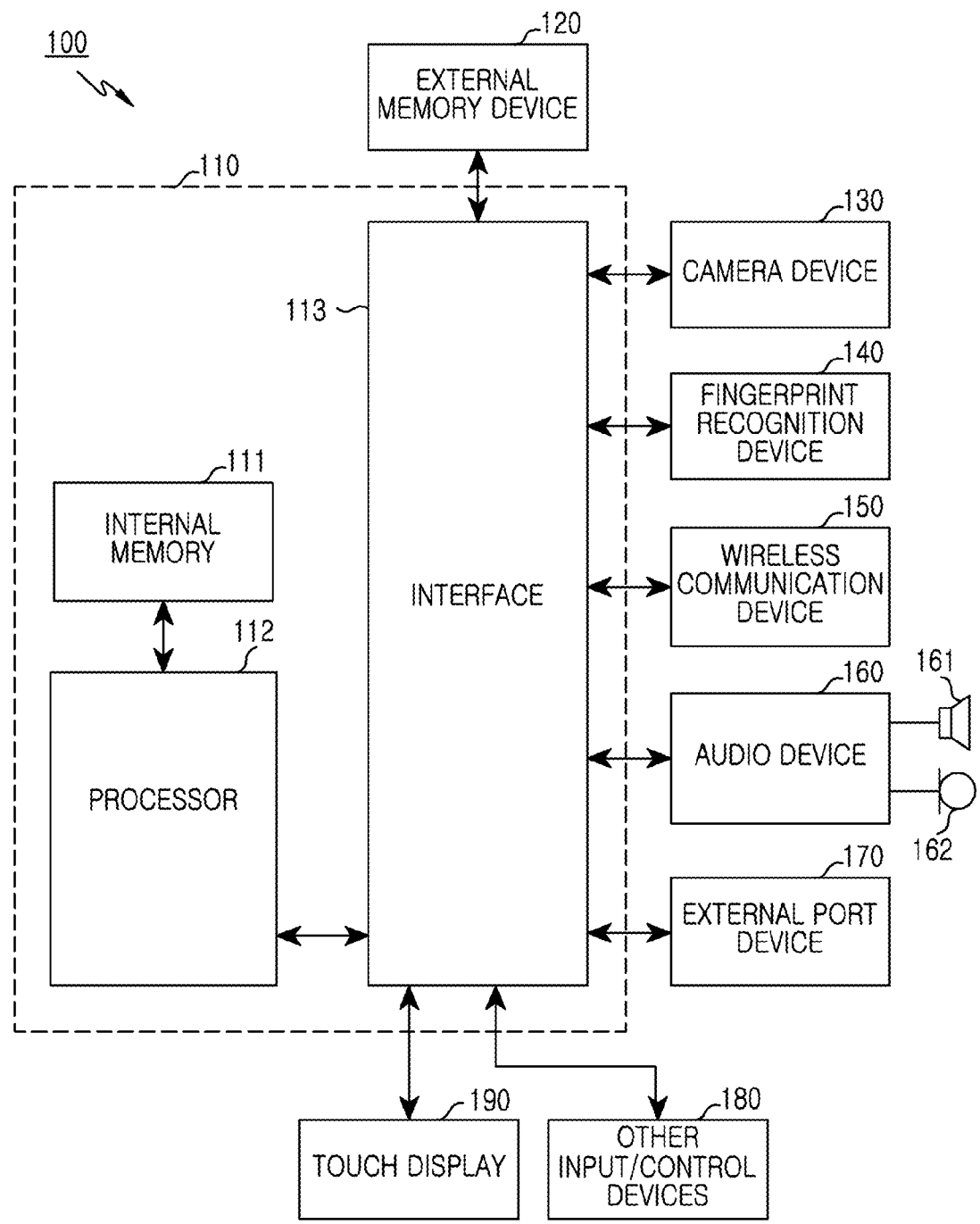
FIG. 2B is a block diagram of an example fingerprint recognition electronic device according to an embodiment of the present invention.

FIG. 2B is a block diagram of an example fingerprint recognition electronic device according to an embodiment of the present invention. The electronic device 100 may include a host device 110, an external memory device 120, a camera device 130, a fingerprint recognition device 140, a wireless communication device 150, an audio device 160, an external port device 170, a touch display 190, and other input/control devices 180. The external memory device 120 and the external port device 170 may be provided in plurality.

The host device 110 may include internal memory 111, at least one processor 112, and an interface 113. The internal memory 111, the at least one processor 112 and the interface 113 may be implemented as separate components or may be implemented in at least one integrated circuit.

The processor 112 may execute various software programs to perform various functions for the electronic device 100, and provide process control for voice communication, video communication, and data communication. In addition to these general functions, the processor 112 may execute software programs (and other instruction sets) stored in the internal memory 111 and/or the external memory device 120 and execute, facilitate or coordinate the various functions provided by each software program.

That is, the processor 112 may perform or enable various embodiments of the present invention in tandem with other functions enabled by the electronic device 100, or other software programs stored in the internal memory 111 and/or the external memory device 120.

The processor 112 may determine whether a recognized fingerprint is a finger white image (indicating the presence of contaminants on the finger or input surface), or whether the area of a recognized fingerprint is smaller than a predetermined reference value (indicating that only a partial fingerprint has been obtained). When the recognized fingerprint is a fingerprint white image, or the area of a recognized fingerprint is smaller than the predefined reference value, a request for a fingerprint retouch input may be displayed to the user. The request may include a text-based message on the touch display 190, a haptic feedback cue, an audio cue, a voice cue, a video cue, a multimedia cue, or some combination of the above. The embodiment of the present invention discussed here will be described in further detail below.

In addition, the processor 112 may include at least one data processor, one image processor, or one codec. In the electronic device 100, the data processor, the image processor, or the codec may be configured separately.

The interface 113 may communicatively connect the various devices of the electronic device 100 to the host device 110.

A camera device 130 may provide camera functionality, enabling actions such as capturing photographic images and recording video clips. The camera device 130 may be implemented utilizing, for example, a "CCD" (charged-coupled device) or a "CMOS" (complementary metal-oxide semiconductor) image sensor device. In addition, the camera device 130 may be equipped with the ability to alter hardware configuration. For example, automation may be provided allowing for mechanically-enabled lens movement, or facilitation of selection between a number of diverse apertures according to a camera program executed by the processor 112.

The various elements of the electronic device 100 may be coupled through at least one communication bus or stream line (with neither included in the illustration).

The fingerprint recognition device 140 may be utilized to analyze (or facilitate analysis of) fingerprints that are received by the electronic device 100. For example, a received fingerprint may be compared and matched with a pre-registered user fingerprint for user identification or authentication.

In one example embodiment, the fingerprint recognition device 140 may include an input sensor unit, a minutiae extraction unit, a fingerprint comparison unit, and a fingerprint storage unit. When a user's fingerprint is scanned through the input sensor unit, the minutiae extraction unit may detect unique features from an image of the scanned fingerprint. Furthermore, the fingerprint comparison unit compares the minutiae of the input fingerprint with the minutiae of a fingerprint registered in the fingerprint storage unit. Finally, the fingerprint comparison unit may determine whether they are a match.

In another example embodiment, the fingerprint recognition device 140 may radiate infrared light towards a finger using an infrared emitting unit. The fingerprint recognition device 140 may then receive infrared light reflected from the finger that has returned after penetrating the surface of the finger, using an infrared light receiving unit. Identification, detection or authentication of the fingerprint may then be based on the amount of the received infrared light.

The fingerprint recognition device 140 may include an optical fingerprint input device or a non-optical fingerprint input device. For example, where an optical fingerprint input device is employed, light is radiated to a fingerprint that is in contact with, for example, a prism. The light is then reflected according to the pattern of the valleys and ridges of the fingerprint, enabling interpretation of a fingerprint image formed by a receiving imaging sensor.

In yet another embodiment, the fingerprint recognition device 140 may employ an RF-based methodology. A fingerprint may be detected via use of a physical principle in which the ridges and valley pattern of a finger print are used to model a mathematical wave. Thereafter, a sine wave of high frequency may be simulated by oscillation of oscillator circuits, and when a fingerprint is sensed, the oscillation amplitude of the oscillator circuits may be decreased or completely cancelled out if the ridges and valleys of the fingerprint, when simulated as a wave, create a substantial amount of destructive interference.

Herein, a "ridge" refers to a fingerprint curve that is a portion of the overall fingerprint. The ridge may include continuous ridges, ridges with ending points in which a ridge ends, and bifurcations in which two ridges meet. These details of continuous ridges, ending points and bifurcations are referred to herein as "minutiae." Minutiae are unique to each individual. Therefore, a database may be created that registers fingerprints of unique users based on the locations and number of the minutiae. The fingerprint recognition device 140 may thus leverage the identifying properties of minutiae to identify or authenticate users.

Figure 1A:
FIG. 1A is an illustration of normal fingerprint recognition.

When analyzing a fingerprint, it may be observed that the fingerprint of the user has ridges and valleys. Therefore, a "deep" portion of the fingerprint (i.e., a valley) may be recognized as "darker" than a "shallow" portion of the fingerprint (i.e., a ridge). Utilizing this scheme for analysis, fingerprint recognition may be performed normally if a proper fingerprint image is received (as illustrated in FIG. 1A). This information may be obtained in a myriad of ways. In one embodiment, when the fingerprint is pressed against a medium, different digital output values may be obtained according to the ridges and valleys of the fingerprint as detected by a sensing device. The sensing device may include a voltage/current supply unit for applying voltage or current.

Figure 1B:
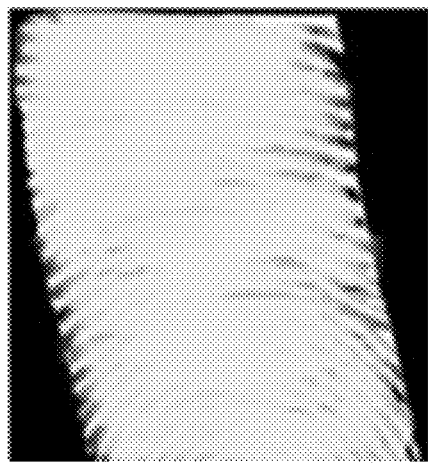
FIG. 1B is an illustration of a fingerprint white image.

However, when a finger is contaminated with foreign substances (such as water or other electrically conductive materials), a fingerprint white image may be received instead (as illustrated in FIG. 1B). Therefore, although the user has performed an ostensibly proper operation to initiate fingerprint recognition, the process may result in fingerprint recognition error anyway.

Whether a fingerprint image constitutes a white image may be determined according to a "white image amount," or a specified number of pixels constituting the white image, which must fall within a threshold range of the recognized fingerprint. A criterion for determining the white image will be elaborated upon in further detail below.

The fingerprint recognition device 140 may be implemented using a combination of at least one of: the capacitive sensing method and the thermal sensing method, in addition to the above-described optical and RF sensing methods.

The wireless communication device 150 enables wireless communication, and may include a wireless frequency transmitter and receiver, an optical (e.g., infrared) transmitter and a receiver. The wireless communication device 150 may be designed to operate through one of a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a WiFi (Wireless Fidelity) network, a WiMax network, and/or a Bluetooth network.

The audio device 160 is connected to the speaker 161 and the microphone 162, and facilitates performance of audio input/output functions such as voice recognition, voice replication, digital recording, and voice communication. That is, the audio device 160 enables communication with the user through the speaker 161 and the microphone 162.

In addition, the audio device 160 may receive data signals from the host device 110, convert the received data signals into electrical signals, and output the converted electrical signals through the speaker 161.

The speaker 161 converts electrical signals into audible frequency bands and outputs the same. The speaker 161 may be disposed on the rear side of the electronic device 100, and includes a flexible film speaker formed by attaching at least one piezoelectric material to a vibration film.

The microphone 162 converts sound waves originating from human or other sound sources into electrical signals. The audio device 160 receives electrical signals from the microphone 162, converts the received electrical signals into audio data signals, and transmits the converted audio data signals to the host device 110. The audio device 160 may include an earphone, a headphone or a headset, which is detachable from the electronic device 100.

The external port device 170 may be used to connect the electronic device 100 to other electronic devices directly, or to other electronic devices indirectly through a network (such as, for example, Internet, intranet, or wireless LAN). The external port device 170 includes a socket unit disposed in the rear side of the electronic device 100.

The touch display 190 may display a text, a graphic, and an image, such as a video, based on signals received from the host device 110. The touch display 190 is disposed on a front side of the electronic device 100, and may include at least one of an LCD (liquid crystal display), OLED (Organic Light Emitting Diode), a flexible display, and a three-dimensional display.

The other input/control devices 180 may include up/down buttons for volume control, a push button to which a relevant function is assigned, a rocker button, a rocker switch, thumbwheel, a dial, a stick, or a pointer device such as a stylus.

The external memory unit 120 includes one or more forms of electronic memory, such as magnetic disk storage devices, one more nonvolatile memory devices, one or more optical storage devices, and/or one or more flash memory units (for example, NAND flash memory units or NOR flash memory units). The external memory device 120 may store software. Software may include an operating system program, a communication program, a graphic program, a user interface program, a codec program, and at least one application program. The term "program" may be expressed as, for example, a collection of instructions, an instruction set, or a module.

The OS program may be WINDOWS, LINUX, Darwin, RTXC, UNIX, OS X, iOS, Android, Windows Mobile, or an embedded OS such as VxWorks, and may include various software components for controlling general system operation. General system operation controls may include memory control and management, storage device control and management, and power control and management. In addition, the OS program may also perform a function for enabling smooth communication between various hardware elements (i.e., devices) and software elements (i.e., programs).

The communication program may enable communication with counterpart electronic devices, such as a computer, a server, and another electronic device, through, for example, the wireless communication device 150 or the external port device 170.

The graphic program may include various software components for providing and displaying graphics on the touch display 190. The graphics may include texts, web pages, icons, digital images, videos, and animations.

The user interface ("UI") program may include various software elements related to a user interface. In addition, the UI program may include information and instructions for determining how the state of a user interface changes and/or information about under what condition the state of a user interface changes.

The codec program may include software components related to video file encoding/decoding.

The camera program may include camera-related software components that enable camera-related processes and functions.

The application program may include a browser application, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, and the like.

The host device 110 may further include an additional program besides the above-described programs. In addition, various functions of the electronic device 100 according to the present invention may be implemented by hardware and/or software including one or more computing paradigms, such as stream processing, and/or an application-specific integrated circuit (ASIC).

Figure 3A:
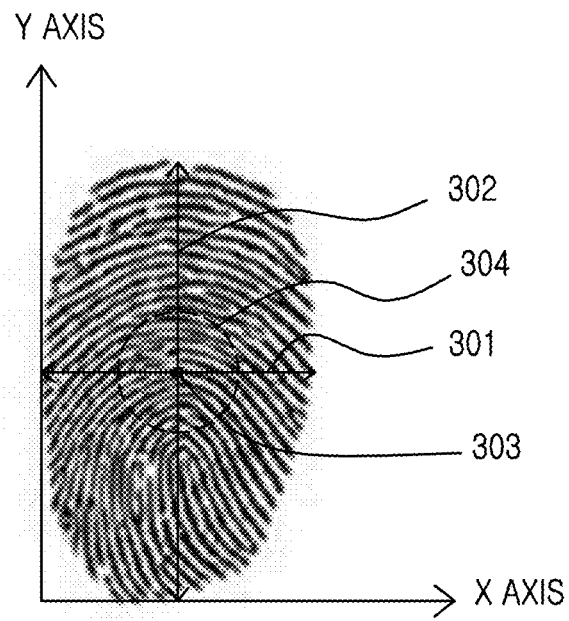
FIG. 3A is a diagram explaining example criterion that may be used to identify a fingerprint white image, according to an embodiment of the present invention.
Figure 3B:
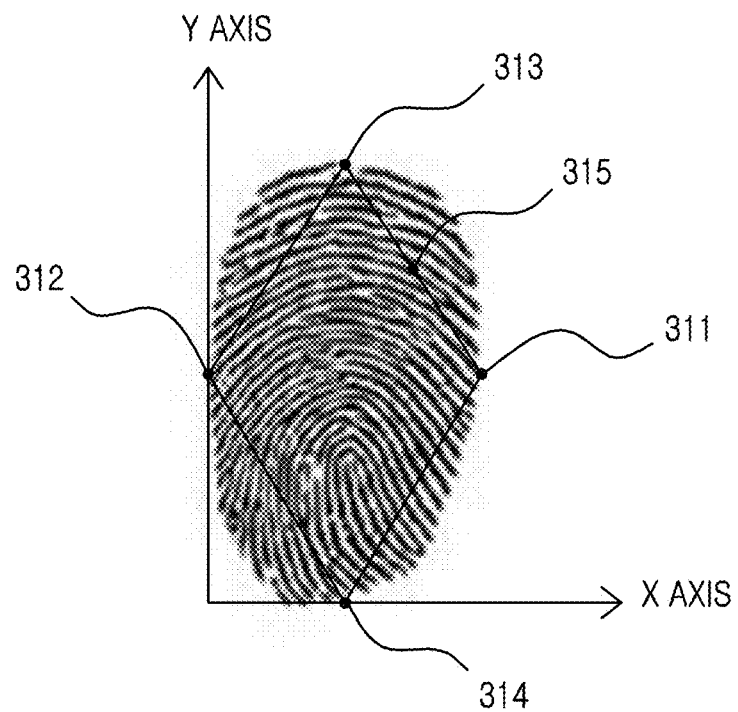
FIG. 3B is a diagram explaining example criterion that may be used to identify a fingerprint white image, according to an embodiment of the present invention.

FIGS. 3A and 3B are diagrams for explaining a criterion to identify a fingerprint white image according to an embodiment of the present invention. A fingerprint recognized by the above-described fingerprint recognition device 140 may be output as a gray-scale fingerprint image as illustrated. The fingerprint image may be output differently according to the above-described fingerprint valleys and ridges (i.e., minutiae), and whether the fingerprint image is a white image may be determined based on certain identifying factors.

As illustrated in FIG. 3A, whether the fingerprint image is a white image may be determined according to a white image amount, or the number of pixels constituting the white image, within a threshold range identified by the circle labeled 304 extending radially from the center 303 of the fingerprint. For example, with reference to a horizontal direction (i.e., x axis) and a vertical direction (i.e., y axis) of the recognized fingerprint, a length 301 in an x-axis direction and a length 302 in a y-axis direction may be identified and represented coordinately.

A cross point between the central points of the lengths may be set as a center 303 of the fingerprint, and the threshold range 304 may be determined based on a distance from the center 303. Therefore, the threshold range 304 may be defined as a circle or a rectangle as illustrated in FIGS. 3A and 3B. When the white image amount within the above-described threshold range 304 exceeds a predefined threshold value for the threshold range 304, the fingerprint image may be identified as a white image.

In addition, as illustrated in FIG. 3B, the white image may be identified according to the white image amount within the threshold range 315 that is formed by connecting end points in the x-axis and y-axis directions of the fingerprint. For example, in the recognized fingerprint, a maximum value point 311 and a minimum value point 312 in the x-axis direction and a maximum value point 313 and a minimum value point 314 in the y-axis direction may be identified and represented coordinately.

As illustrated, the respective points are connected to each other through a straight line to form a rectangle threshold range 315. When the white image amount within the threshold range 315 exceeds a threshold value, the fingerprint image may be determined to be a white image.

In addition, white images may be detected according to various other methodologies. For example, a method may be utilized that compares the fingerprint image to a white image stored in the memory of the electronic device 100. If the fingerprint image is a match to the white image to some pre-specified threshold, the fingerprint image may be identified as a white image.

Figure 6:
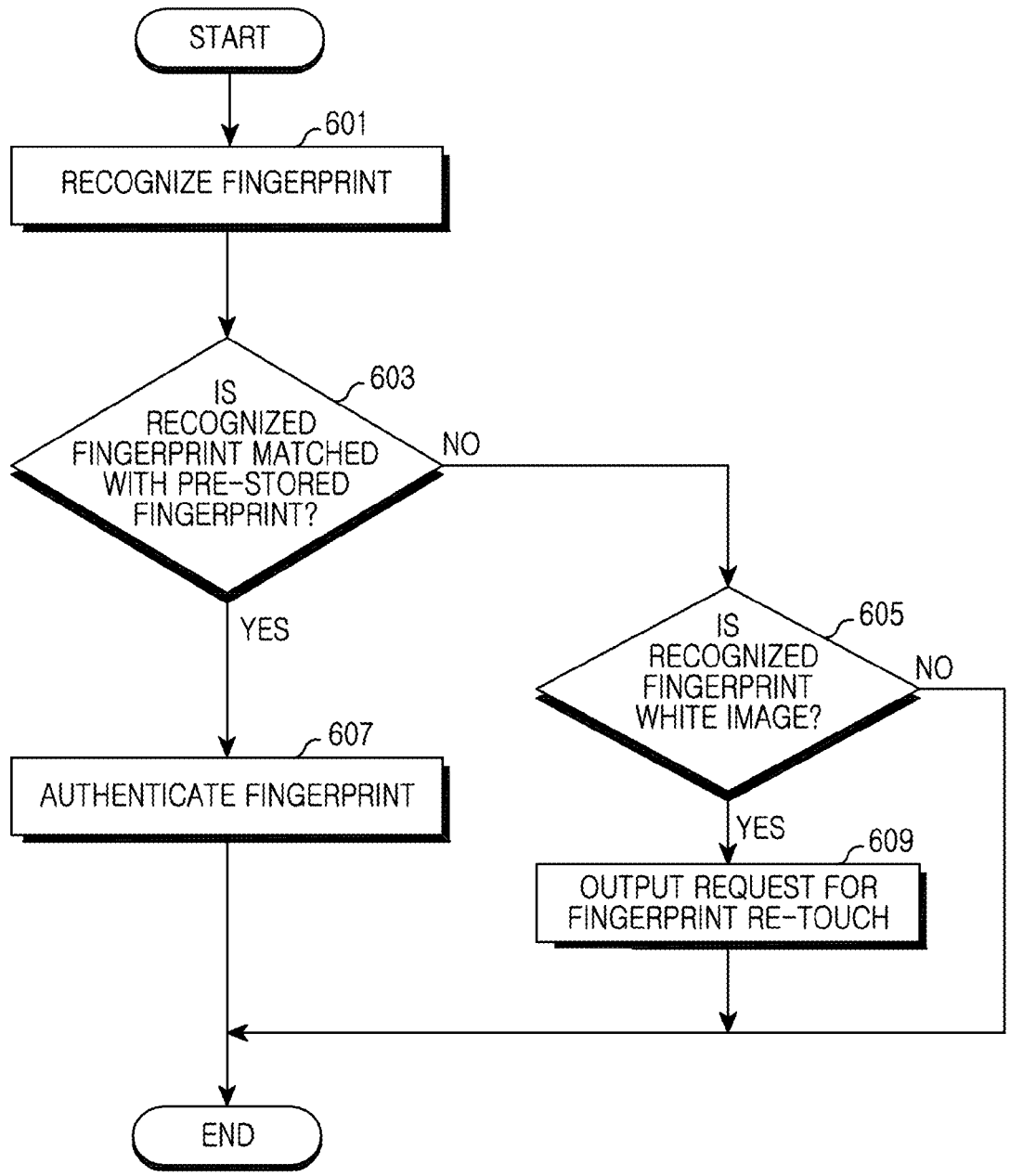
FIG. 6 is a flowchart illustrating an example method for detection of fingerprint white images and fingerprint authentication according to an embodiment of the present invention.

FIG. 6 is a flowchart illustrating an example method for detection of fingerprint white images and fingerprint authentication according to an embodiment of the present invention.

Referring to FIG. 6, in step 601, a fingerprint received through a touch input may be recognized by the fingerprint recognition device 140. As described above, "fingerprint" refers to the flowing pattern of ridges in the tip of an individuals' finger. A fingerprint may be recognized by the electronic device 100 when it is placed against a touch display 190 and registers as a touch input. Alternatively, the fingerprint may be recognized using a touchless input method. For example, a fingerprint may be recognized when it is places sufficiently near a touch display 190 to register as a "hover" input.

The method and device for recognizing a fingerprint may be implemented using at least one of optical, capacitive, thermal sensing and RF methods.

In one example implementation, the fingerprint recognition device 140 may include an input sensor unit, a minutiae extraction unit, a fingerprint comparison unit, and a fingerprint storage unit. When a user's fingerprint is scanned through the input sensor, the minutiae extraction unit may identify unique minutiae from an image of the scanned fingerprint. The fingerprint comparison unit compares the minutiae of the input fingerprint with the minutiae of a fingerprint registered in the fingerprint storage unit and determines whether they match.

The fingerprint recognition device 140 may include an optical fingerprint input device or a non-optical fingerprint input device. For example, in the case of a fingerprint recognition device 140 employing the optical fingerprint input device, light may be radiated to a fingerprint that is in contact with, for example, a prism. The radiated light may then be reflected back according the pattern of valleys and ridges of the fingerprint, thus enabling receival and analysis of a fingerprint image formed by an imaging sensor.

In another embodiment employing a RF-based methodology, a fingerprint may be detected based on the principle of wave interference. First, a sine wave of high frequency is generated by the oscillation of oscillator circuits. When a fingerprint is sensed, the ridges and valleys of the fingerprint may be utilized to simulate a sine wave. The oscillation amplitude of the oscillator circuits may then be decreased or completely cancelled out by destructive interference from the sine wave based on the fingerprint.

The fingerprint recognition device 140 may also be implemented using a combination of at least one of: the capacitive sensing method, and thermal sensing methods, in addition to the above-described optical method and RF method.

In step 603, the fingerprint recognition 140 device determines whether the recognized fingerprint matches a pre-stored fingerprint. The pre-stored fingerprint may be stored in the memory of the electronic device 100, and may be matched with the recognized fingerprint using one or more of the above-described methods. When the recognized fingerprint and the pre-stored fingerprint match to a degree that is equal to or larger than a predetermined reference value indicating whether two fingerprints are a match, the fingerprint recognition device 140 may determine that the received fingerprint matches the pre-stored fingerprint. The above operation is coordinated by the fingerprint recognition device 140 or/and the processor 112.

In an alternative embodiment, steps 603 and 607 may be exchanged with steps 605 and 609.

In step 607, the fingerprint may be authenticated. Fingerprint recognition may be used to authenticate a particular user, and may therefore be leveraged to provide security and other authentication functions and applications. For example, fingerprint recognition may be used for lock release and password release in the electronic device 100, or for other tasks requiring a user authentication, such as website log-in, file access, or execution of sensitive tasks that require confirmed permission (e.g. online banking, remittance).

When the fingerprint recognition device 140 determines that the fingerprint does not match the pre-stored fingerprint, then in step 605, the fingerprint recognition device 140 may determine whether the fingerprint is a white image. As described above, the recognized fingerprint may be received as or converted into a gray-scale image (e.g., FIG. 1A) because a deeper portion of the fingerprint is depicted as visually darker than a shallow portion of the fingerprint, according to the ridges and valleys (i.e., the minutiae) of the fingerprint.

However, the user's finger or the fingerprint input surface may be contaminated with a foreign substance (such as water or some other conductive material). This will often result in a fingerprint white image, as illustrated in FIG. 1B, which causes errors in fingerprint recognition and authentication. The white image may be recognized according to predetermined criteria and methodologies as described above (e.g., FIGS. 3A and 3B, or by matching against a pre-stored white image).

In any event, if the fingerprint recognition device 140 determines that the received fingerprint is not a white image, then fingerprint authentication may be deemed to have failed. If a count is kept of user attempts to access the protected system fingerprint authentication, the count may be increased by one.

If, however, the fingerprint recognition device 140 determines that the received fingerprint is not a white image, then in step 609, a request for fingerprint retouch may be displayed to the user. The request for fingerprint retouch may be displayed via variety of means. For example, it may take the form of a readable message displayed on the touch display 190 or, an audible cue or voice track output from the speaker 161. Additionally, the content of the message may include a request for the user to remove any contaminants from both their finger and the surface of the touch display 190, and then re-perform the fingerprint touch input action, as illustrated in FIG. 4.

Figure 4:
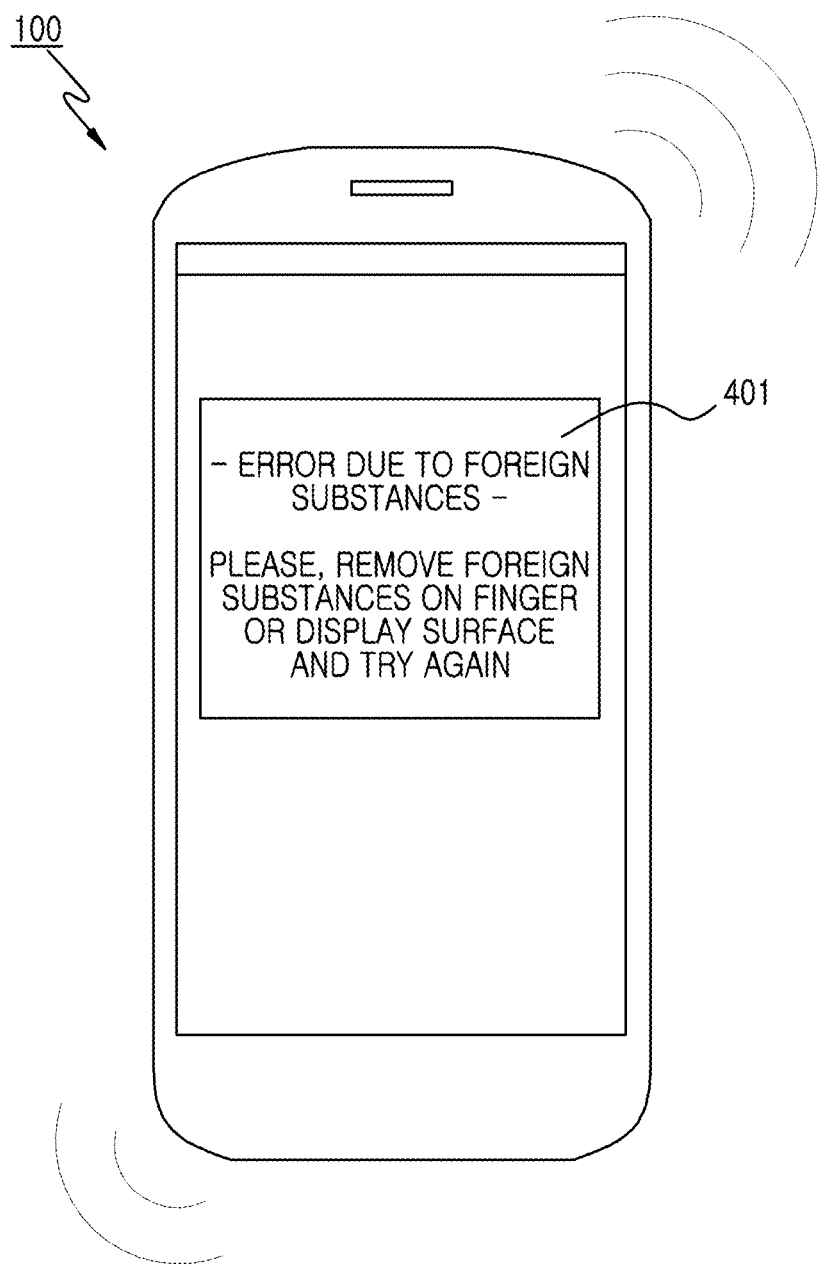
FIG. 4 is an illustration visualizing an example request for a fingerprint retouch input according to an embodiment of the present invention.

The request for a fingerprint retouch input may be displayed as a pop-up window 401 within the graphical user interface of the electronic device 100, as illustrated in FIG. 4. The pop-up window 401 may be supported with audio and haptic cues, such as an audible alarm sound or a vibration. The processor 112 coordinates the authentication process such that, in the case where a count is kept of number of failed access attempts, the count is not increased despite of failure to authenticate the received fingerprint.

Thereafter, the process of the present invention ends.

Instruction sets for the respective steps may be stored in the internal memory device 111 or external memory device 120, and may be conceptualized as one more modules. Here, the relevant module corresponding to the above-described process is performed by the at least one processor 112.

Since the embodiment which will be described below is similar to the above-described embodiment, a correspondingly detailed description is hereby omitted for the sake of brevity.

Figure 7:
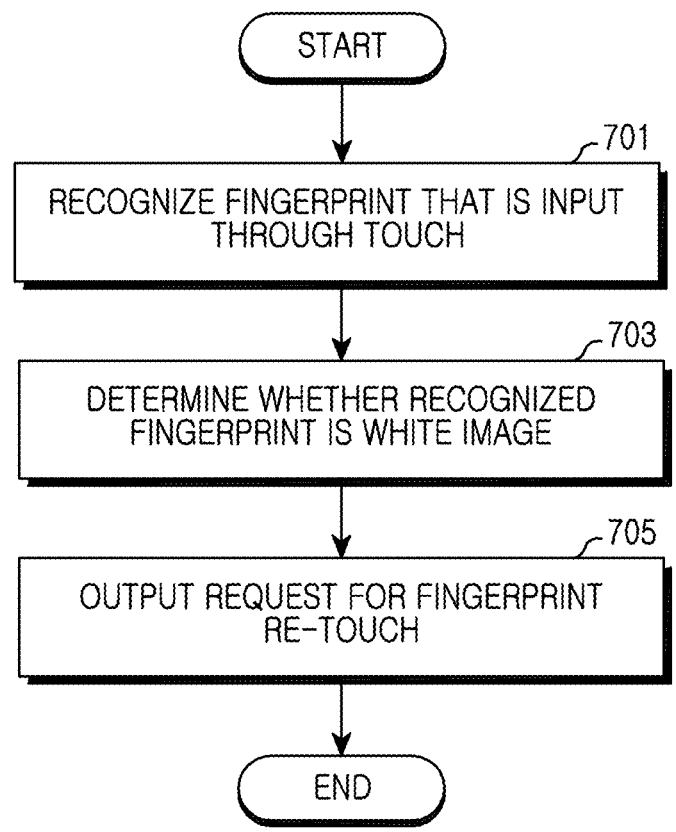
FIG. 7 is a flowchart illustrating an example method for detection of fingerprint white images and fingerprint authentication according to another embodiment of the present invention.

FIG. 7 is a flowchart illustrating an example method for detection of fingerprint white images and fingerprint authentication according to another embodiment of the present invention.

In step 701, the fingerprint recognition device 140 may receive and recognize a fingerprint that is generated by a user touch input. The fingerprint may be recognized through a direct touch input method, or a touchless input method. As described above, fingerprint recognition may be implemented using, for example, optical, capacitive, thermal sensing and RF methods. In addition, combinations of the above-described methods may be implemented according to need and advantage. As this process has already been described, detailed description regarding the fingerprint recognition process will be omitted.

In step 703, if the received fingerprint does not pass a first level of scrutiny (such as a determination that it does not match any of the valid fingerprint patterns on record), the fingerprint recognition device 140 may determine whether the received fingerprint is a white image. As described above, determination of whether the fingerprint is a white image may be made according to predetermined criteria, or through matching based on a pre-stored fingerprint white image. As this process has already been described, detailed description related to detection of white images will be omitted.

In step 705, if the received fingerprint is determined to be a white image, the fingerprint recognition device 140 may cause a request for a fingerprint retouch input to be displayed on the touch display 190. The request for fingerprint retouch input may take a variety of formats, such as text-based message shown on the touch display 190, or and audio cue or voice cue. In addition, the content of the request includes instructions for the user to remove contaminants from their finger and from the surface of the touch display 190 before reperforming the fingerprint touch input, as illustrated in FIG. 4.

The request for fingerprint retouch may be displayed via, for example, a pop-up window 401 (of FIG. 4) within the graphical user interface of the electronic device 100. The request may be accompanied by other notifications, such as audio cues, voice cues, alarm sounds and vibration. In addition, the processor 112 coordinates the process, in the case where a count is kept of number of failed access attempts, the count is not increased despite the failure to authenticate the received fingerprint.

Thereafter, the process of the present invention is ended.

Figure 8:
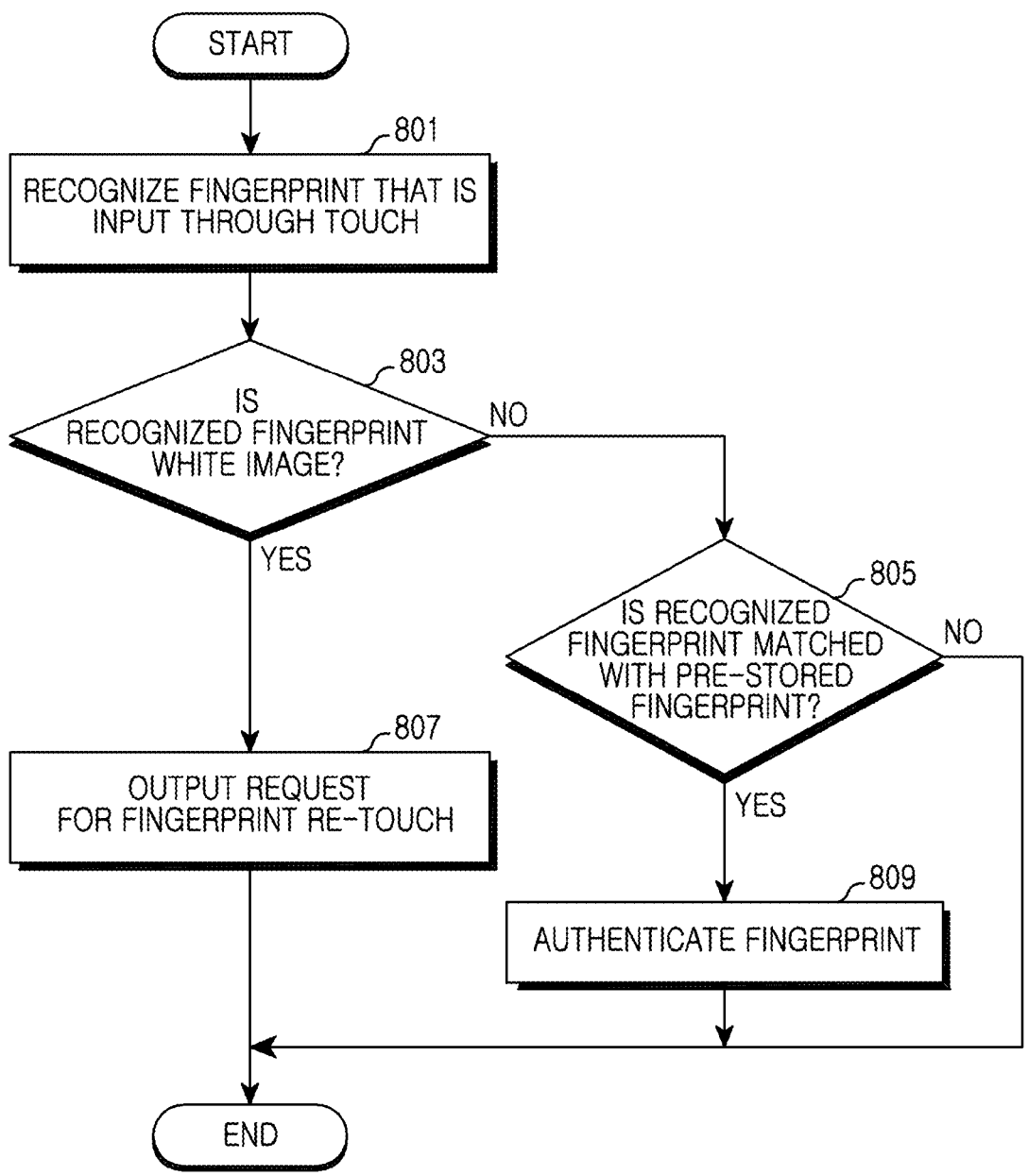
FIG. 8 is a flowchart illustrating an example method for detection of fingerprint white images and fingerprint authentication according to another embodiment of the present invention.

FIG. 8 is a flowchart illustrating an example method for detection of fingerprint white image and fingerprint authentication according to another embodiment of the present invention. In step 801, the fingerprint recognition device 140 may receive and recognize a fingerprint from a user touch input. The fingerprint may be received via a direct touch input method, or a touchless input method to, for example, the touch display 190. The fingerprint may be captured using, for example, one of the above-described methods, these being optical, capacitive, thermal sensing and RF methodologies. In addition, combinations of the above-described methods may be implemented as required or as it is deemed advantageous to do so.

In step 803, if authentication of the fingerprint fails, the fingerprint recognition device 140 may determine whether the recognized fingerprint is a white image. A white image may be identified according to predetermined criteria, as described above (e.g., FIGS. 3A and 3B, or through matching against a pre-stored white image).

In step 807, if the received fingerprint is determined to be a fingerprint white image, the fingerprint recognition device 140 or the processor 112 may cause a request for fingerprint retouch may be displayed. The request for a fingerprint retouch input may be, for example, a text-based message displayed on the touch display 190, or an audio cue or voice cue outputted from the speaker 161. The content of the request includes an instruction to remove contaminants from the user's finger and from the surface of the touch display 190, and to reperform the fingerprint touch input, as illustrated in FIG. 4.

The request for fingerprint retouch may be displayed as a pop-up window 401 (of FIG. 4) within the graphical user interface of the electronic device 100, and may also be accompanied by, for example, an alarm sound or vibration. In addition, the processor 112 coordinates the process such that, in the case where a count is kept of number of failed access attempts, the count is not increased despite the failure to authenticate the received fingerprint.

If the fingerprint recognition device 140 determines that the recognized fingerprint is not a white image, then in step 805, authentication of the recognized fingerprint may be conducted against a pre-stored fingerprint image. The pre-stored fingerprints may be stored in the internal memory device 111 or external memory device 120 of the electronic device 100. Matching may be conducted using any of the above-described methods.

When the recognized fingerprint is successfully matched with the pre-stored fingerprint, the fingerprint may be authenticated in step 809.

The fingerprint recognition and authentication method and apparatus described above may therefore be used to authenticate a particular user, and may have applications in a variety of security systems and authentication fields. For example, fingerprint recognition may be used to control lock release and password release for the electronic device 100, or tasks requiring user authentication, such as an account log-in, file access or sensitive tasks (such as online banking and remittance).

When fingerprint recognition device 140 has determined that the fingerprint does not match the pre-stored fingerprint, and the fingerprint is not a fingerprint white image, fingerprint authentication may be deemed to have failed one time. If a count is kept of the number of failed access attempts, the count may be increased by one.

Thereafter, the process of the present embodiment may be ended.

Figure 9:
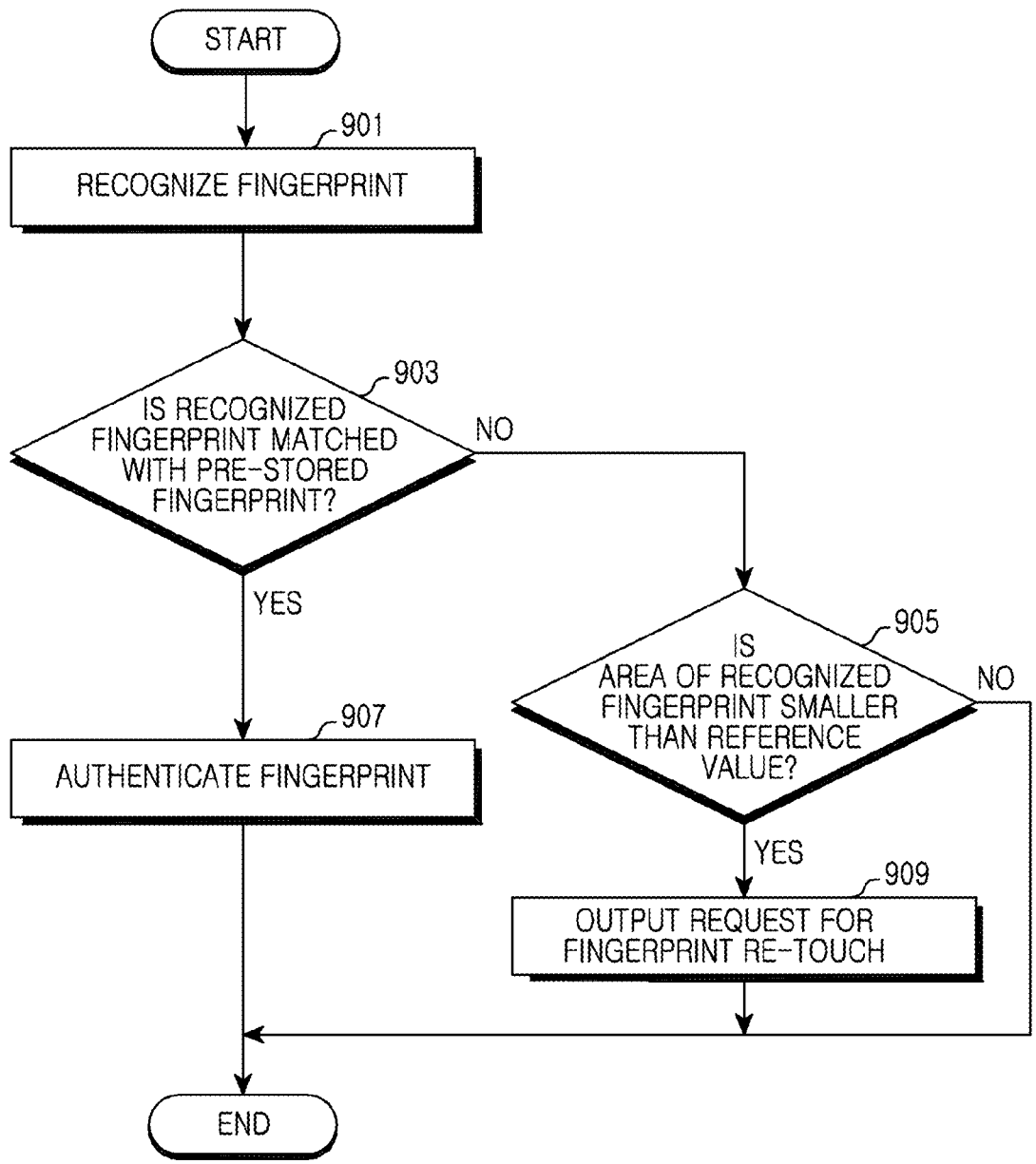
FIG. 9 is a flowchart illustrating an example method for detection of partial fingerprints and fingerprint authentication according to another embodiment of the present invention.

FIG. 9 is a flowchart illustrating an example method for detection of fingerprint white images and fingerprint authentication according to another embodiment of the present invention. Referring to FIG. 9, in step 901, the fingerprint recognition device 140 may receive and recognize a fingerprint from a user touch input. The fingerprint may be received through a direct touch input method, or a touchless input method. The recognition and receival of fingerprint patterns may be implemented using a variety of methods, including optical, capacitive, thermal sensing and RF methods, as described above.

In step 903, the fingerprint recognition device 140 may determine whether the received fingerprint matches a pre-stored fingerprint. As described above, the pre-stored fingerprint may be stored in the internal memory device 111 or external memory device 120 of the electronic device 100. The fingerprint recognition device may execute the match determination process according to any of the embodiments described above. For example, in one embodiment, when a similarity between the received fingerprint and the pre-stored fingerprint is equal to or larger than a predefined reference value, the fingerprint recognition device 140 may determine that the recognized fingerprint is a match with the pre-stored fingerprint. The operation is controlled by the fingerprint recognition device 140 or/and the processor 112.

When the recognized fingerprint matches with the pre-stored fingerprint, the fingerprint recognition device 140 may authenticate the fingerprint in step 907.

Fingerprint recognition may be used to authenticate a particular user, and may thus be leveraged for various security system and authentication purposes. For example, fingerprint recognition may be used to control lock release and password release in the electronic device 100, or a task requiring user authentication, such a website log-in, access to a file, or some sensitive task (such as banking or remittance).

If the recognized fingerprint does not match the pre-stored fingerprint, then in step 905, the fingerprint recognition device 140 may determine whether the fingerprint is a partial fingerprint, the partial fingerprint being only a portion of the full fingerprint of the user. For example, when only some portion of a user's total fingerprint is pressed against the touch display 190, only a part of the user's fingerprint may be detected. The fingerprint recognition device 140 may therefore determine whether the area of the received fingerprint is smaller than a predetermined reference value may be determined. According to one embodiment, a pre-stored area of the user fingerprint may be identified. Subsequently, the fingerprint recognition device 140 may determine whether the area of the recognized fingerprint is smaller than a predefined reference area value (e.g., 50% of the pre-stored reference area). When the area of the received fingerprint is equal to or larger than the predefined reference value, the fingerprint recognition device 140 may deem fingerprint authentication to have failed one time.

These processes are facilitated and controlled by the processor 112 or/and the fingerprint recognition device 140.

In another embodiment, steps 903 and 907 may be exchanged with steps 905 and 909.

Figure 5:
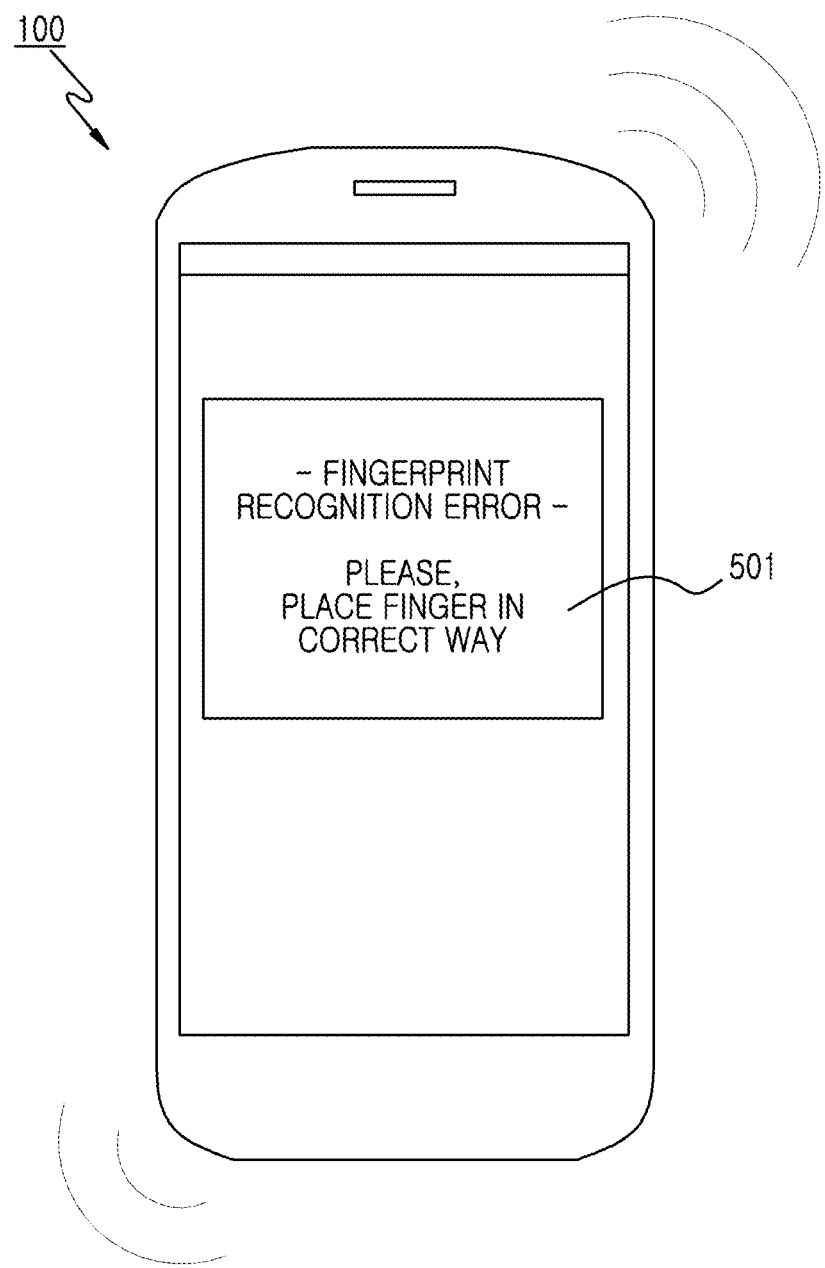
FIG. 5 is an illustration visualizing an example request for a fingerprint retouch input according to an embodiment of the present invention.

In step 909, the fingerprint recognition device 140 may display a request for fingerprint retouch input on the touch display 190. The request for fingerprint retouch may be output through a variety of formats, including, for example, a text-based message displayed on the touch display 190, with accompanying audio or haptic cues. In addition, the message requesting a fingerprint retouch input includes an instruction for the user to ensure that the finger makes full contact with the touch display 190. The request for a fingerprint retouch input may be displayed as a pop-up window 501 of FIG. 5 (which may be displayed within the graphical use interface of the electronic device 100), and may be accompanied with audio cues, such as an alarm sound and haptic feedback, such as a vibration. In addition, the processor 112 coordinates the process such that, in the case where a count is kept of number of failed access attempts, the count is not increased despite the failure to authenticate the received fingerprint.

Thereafter, the process of the present embodiment is ended.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for fingerprint authentication in an electronic device, comprising:
    recognizing a fingerprint in responsive to a touch input to a touch input unit;
    detecting whether the recognized fingerprint is a white image;
    displaying a request for a fingerprint re-touch on a display if the recognized fingerprint is detected to be the white image;
    increasing a count of a number of times a fingerprint authentication process failed if the authentication process fails; and
    maintaining a current total of the count if the recognized image is determined to be the white image.

2. The method of claim 1, further comprising: if the recognized fingerprint is not the white image, detecting whether the recognized fingerprint is matched with a pre-stored fingerprint.

3. The method of claim 1, wherein the request for fingerprint re-touch includes at least one of: a message displayed on the touch display, and an audio cue played through a speaker.

4. The method of claim 3, wherein a content of the request for the fingerprint re-touch includes an instruction for a user to remove contaminants from a finger and from a surface of the touch input unit, and to reperform a touch with the finger on the touch display.

5. The method of claim 1, wherein the white image is an image in which at least a part of the recognized fingerprint is displayed in white due to a contaminant.

6. The method of claim 5, further comprising measuring an amount of the recognized fingerprint that is output in white within a predefined threshold range from a center of the recognized fingerprint.

7. The method of claim 1, wherein recognition of the recognized fingerprint is implemented using at least one of optical recognition, capacitive recognition, and radio frequency recognition.

8. An electronic device comprising:
a display;
a touch input unit;
a fingerprint recognition device configured for recognize a fingerprint in responsive to a touch input on the touch input unit;
at least one memory; and
a processor configured for
  detecting whether the recognized fingerprint is a white image,
  displaying on the touch display a request for a fingerprint re-touch if the recognized fingerprint is detected to be the white image,
  increasing a count of a number of times a fingerprint authentication process failed if the authentication process fails, and
  maintaining a current total of the count if the recognized image is determined to be the white image.

9. The electronic device of claim 8, wherein the processor determines whether the recognized fingerprint matches with a pre-stored fingerprint if the recognized fingerprint is not the white image.

10. The electronic device of claim 8, wherein the request for fingerprint re-touch includes at least one of: a message displayed on the display, and an audio cue played through a speaker.

11. The electronic device of claim 10, wherein a content of the request for fingerprint re-touch includes an instruction for a user to remove contaminants from a finger and from a surface of the touch input unit, and to reperform a touch with the finger on the touch input unit.

12. The electronic device of claim 8, wherein the white image is an image in which at least a part of the recognized fingerprint is output in white due to a contaminant.

13. The electronic device of claim 12, further comprising measuring an amount of the recognized fingerprint that is output in white within a predefined threshold range from a center of the recognized fingerprint.

14. The electronic device of claim 8, wherein fingerprint recognition is implemented using at least one method of optical recognition, capacitive recognition, and radio frequency recognition.

15. A method for recognizing a fingerprint in an electronic device, comprising:
recognizing a fingerprint in responsive to a touch input;
detecting whether an area of the recognized fingerprint is smaller than a reference value;
responsive to the area being smaller than the reference value, displaying on a display screen a request for a fingerprint re-touch;
increasing a count of a number of times a fingerprint authentication process failed if the authentication process fails; and
maintaining a current total of the count if the recognized image is determined to be a white image.

16. The method of claim 15, further comprising, if the area is equal to or larger than the reference value, determining whether the recognized fingerprint matches with a pre-stored fingerprint.

17. An electronic device comprising:
a display;
a touch input unit;
a fingerprint recognition device configured for recognizing a fingerprint in responsive to a touch input on the touch input unit;
at least one memory; and
a processor configured for:
  detecting whether an area of the recognized fingerprint is smaller than a reference value,
  displaying on the display a request for fingerprint re-touch if the area is smaller than the reference value,
  increasing a count of a number of times a fingerprint authentication process failed if the authentication process fails; and
  maintaining a current total of the count if the recognized image is determined to be a white image.

18. A method for recognizing a fingerprint in an electronic device, comprising:
recognizing a fingerprint in responsive to a touch input;
detecting whether the recognized fingerprint matches a pre-stored fingerprint;
detecting whether the recognized fingerprint is a white image if the recognized fingerprint does not match with the pre-stored fingerprint; and
displaying on a display screen a request for a fingerprint re-touch if the recognized image is detected to be the white image;
detecting that fingerprint authentication has failed if the recognized image is detected not to be the white image;
increasing a count of a number of times a fingerprint authentication process failed if the authentication process fails; and
maintaining a current total of the count if the recognized image is determined to be the white image.

* * * * *

UNITED STATES PATENT AND TRADEMARK OFFICE
CERTIFICATE OF CORRECTION

| | |
|---|---|
| PATENT NO. | : 9,311,519 B2 |
| APPLICATION NO. | : 14/105303 |
| DATED | : April 12, 2016 |
| INVENTOR(S) | : Heon-Tak Lee |

Page 1 of 1

It is certified that error appears in the above-identified patent and that said Letters Patent is hereby corrected as shown below:

In The Claims

Column 15, Claim 8, Line 27 should read as follows:
--…configured for recognizing a…--

Column 15, Claim 8, Lines 31-32 should read as follows:
--…configured for: detecting whether…--

Column 15, Claim 8, Line 34 should read as follows:
--…on a display a…--

Signed and Sealed this
Fourteenth Day of June, 2016

Michelle K. Lee
*Director of the United States Patent and Trademark Office*